Dec. 14, 1937. B. S. T. BISHOP ET AL Re. 20,579
HAND OPERATED, ELECTRIC CONTROLLED, TAPPING DEVICE
Original Filed March 16, 1934 3 Sheets-Sheet 1
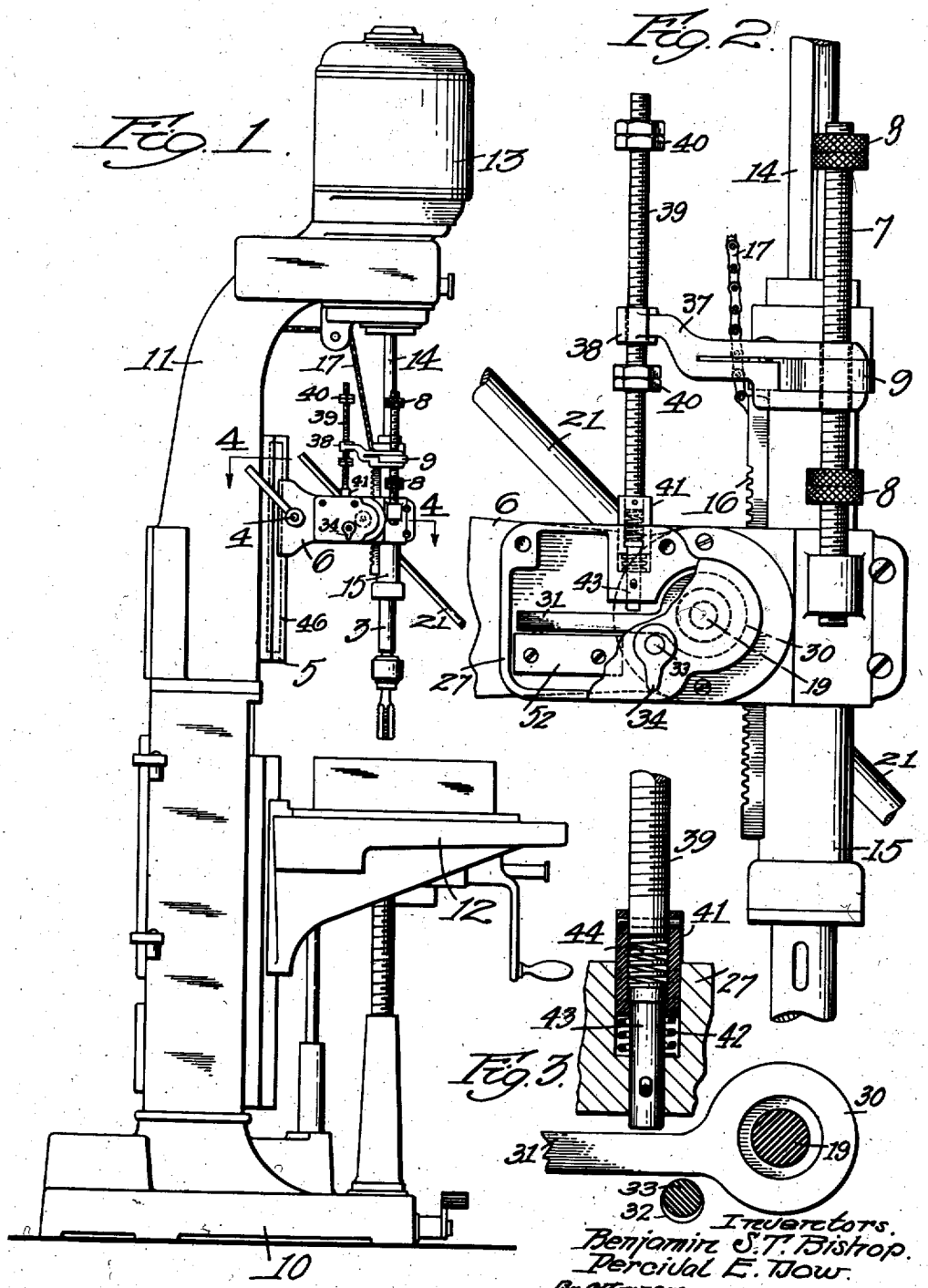
Inventors.
Benjamin S. T. Bishop.
Percival E. Dow.
By attorneys
Courtlyde Fay & Hanley Dec. 14, 1937. B. S. T. BISHOP ET AL Re. 20,579
HAND OPERATED, ELECTRIC CONTROLLED, TAPPING DEVICE
Original Filed March 16, 1934 3 Sheets-Sheet 2
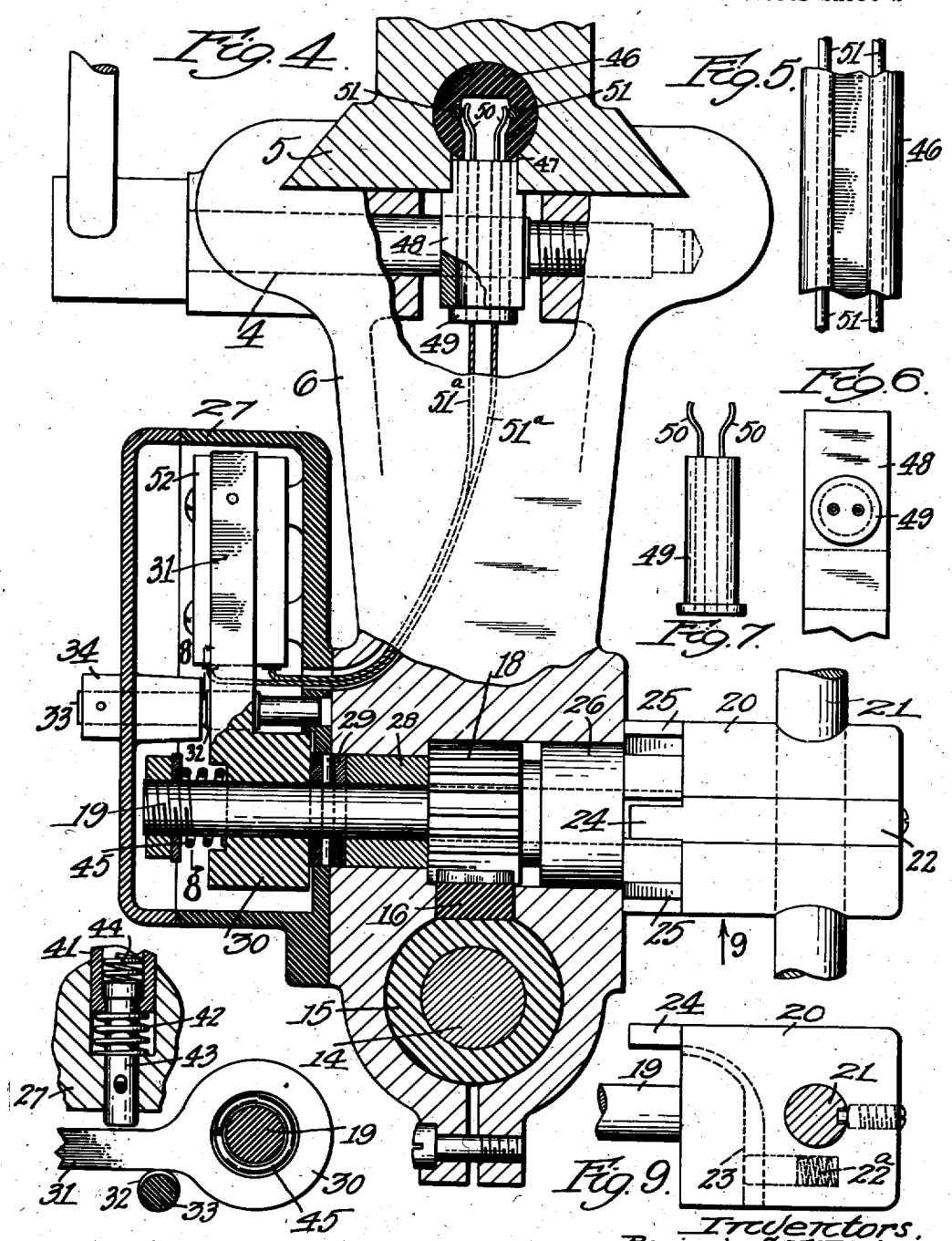
Inventors.
Benjamin S. T. Bishop.
Percival E. Now.
By attorneys
Southgate Fay & Hanley Dec. 14, 1937. B. S. T. BISHOP ET AL Re. 20,579

HAND OPERATED, ELECTRIC CONTROLLED, TAPPING DEVICE

Original Filed March 16, 1934 3 Sheets-Sheet 3

Inventors.
Benjamin S. T. Bishop.
Percival E. Now.
By attorneys
Smith Fay & Hurley Reissued Dec. 14, 1937

Re. 20,579

UNITED STATES PATENT OFFICE 20,579

HAND OPERATED, ELECTRIC CONTROLLED, TAPPING DEVICE

Benjamin S. T. Bishop, Shrewsbury, and Percival E. Dow, Leicester, Mass., assignors to Leland-Gifford Company, a corporation of Massachusetts Original No. 1,970,218, dated August 14, 1934, Serial No. 715,932, March 16, 1934. Application for reissue August 12, 1936, Serial No. 95,698

39 Claims. (Cl. 10—136)

This invention relates to tapping machines.

Tapping machines, prior to this invention, have usually had clutches, reversing mechanism and the like to change the direction of rotation of the tap for advancing it into and for retracting it out of the work, the direction of rotation of the source of power for rotating the tap usually being constant.

It is an object of this invention to provide a tapping machine so arranged that the direction of rotation of the source of power, usually an electric motor, can be reversed readily for reversing the direction of rotation of the tap, whereby to eliminate the use of mechanical reversing mechanisms and hence to simplify the construction and render it substantially free from adjustments and repairs.

A further object of the invention is the provision of a tapping machine having a reversible driving motor for securing advance and retraction of the tap into and out of the work, and wherein the tap can be retracted and re-advanced, by reversal of the motor, at any position of the tap in the work.

A yet further object of the invention is the provision of a tapping machine having a reversible tap-driving motor the direction of rotation of which can be changed at the will of an operative for the purpose of controlling the direction of tapping at any depth of the tap in its hole.

Another object of the invention is the provision of a tapping machine having a reversible tap-driving motor and a manually operated handle which is operated to advance the tap toward and away from the work and also to control the direction of tapping by controlling the direction of rotation of the motor.

A further object of the invention is the provision of an improved tapping machine having a manually operable part movable in one direction to advance the tap toward the work and the rotation of the tap in a feeding direction and movable in the opposite direction to effect the rotation of the tap out of the work and the tap away from the work.

Another object of the invention is the provision of a tapping machine having an advanceable and retractible tap-carrying spindle driven by a reversible motor, the spindle being advanceable and retractible by hand and also by the action of the tap in the work due to the direction of rotation of the tap, a switch member movable manually and also by the spindle into motor controlling positions, and a lost motion connection between the switch and the spindle so that the switch can be controlled manually during tap-operated movements of the spindle.

A further object of the invention is the provision of a tapping machine having an advanceable and retractible tap carrying spindle driven by a reversible motor, and means, and particularly manual means, for advancing and rotating the spindle and for controlling the direction of rotation of the motor at any depth of the tap in the work.

A yet further object of the invention is generally to improve the construction and operation of tapping machines.

Another object of the invention is an arrangement whereby a motor driven drilling machine can be adapted for tapping purposes at small expense; and also restored for drilling purposes when desired in a simple manner.

Another object of this invention is to provide a reversing mechanism for a tapping device which will be very sensitive.

Other objects of the invention are to provide a simple and at the same time sensitive means for transmitting the motion of a hand-operated lever in such a way as to reverse the motor by an electric control and to provide that control in a simple, sensitive and effective form.

Other objects and advantages of the invention will appear hereinafter.

Fig. 1 is a side view of a drill and tapping machine provided with a preferred form of our invention.

Fig. 2 is a similar view on enlarged scale with parts cut away to show interior construction of the sliding head.

Fig. 3 is a sectional view of the switch connecting device shown in Fig. 2.

Fig. 4 is a horizontal sectional view on the line 4—4 of Fig. 1.

Fig. 5 is a front elevation of a pair of trolley wires shown in Fig. 4.

Fig. 6 is an end view of the filler block.

Fig. 7 is a plan of the brush holder.

Fig. 8 is a view similar to Fig. 3 with the parts in a different position.

Fig. 9 is an elevation looking in the direction of the arrow 9 in Fig. 4, and

Figure 10:
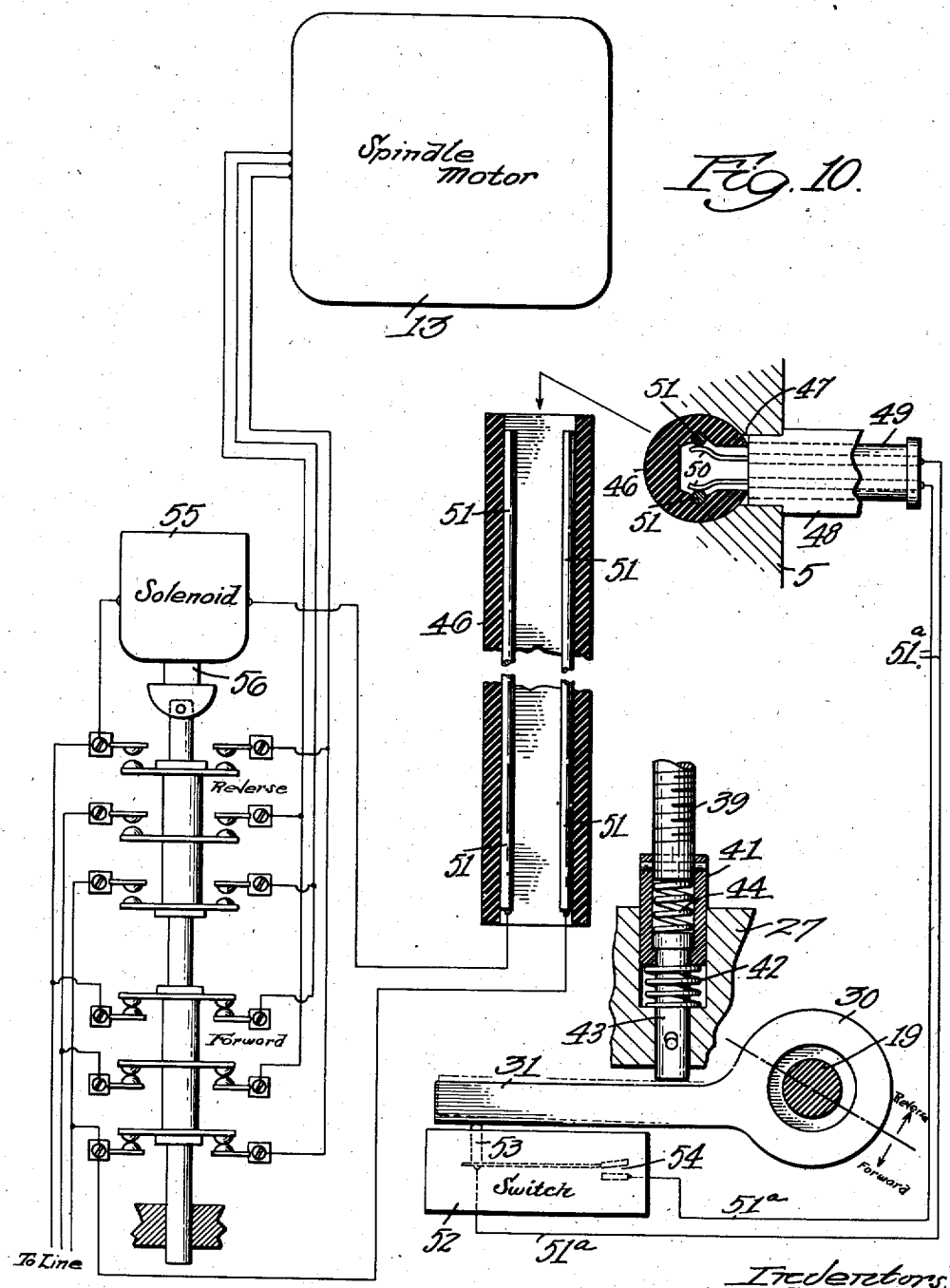
Fig. 10 is a diagrammatic wiring diagram showing the connecting parts in position.

The invention, as shown, is applied to an ordinary drilling machine having a base 10, gooseneck 11 and adjustable work support 12. This drill, as usual, is provided with a motor 13, here shown as a three phase motor, for driving a spindle 14 which passes through a quill 15. The spindie drives a tap holder 3. The quill is supported for vertical advance and retraction movements with the spindle in a sliding head 6. The sliding head 6 is mounted to slide on vertical ways 5 rigidly mounted on the gooseneck. The quill is slidable in the head 6 and is provided with a rack 16 and a chain 17 for connection with a counterbalancing weight which is not shown but is located inside the frame so that the spindle remains in any position into which it may be left when the tap is out of the hole. Meshing with the rack is a quill-raising and lowering pinion 18 loose on a cross head stud 19. On this stud is fixed a hub 20 having radial operating arms 21 rotatably-loose in the hub and which constitute the means by which the quill is fed by hand.

On the stud 19 is a bushing 28 filling the space between the gear and a collar 29 beyond which is the hub 30 of a switch finger 31. Said collar 29 is fixed to said stud 19 by suitable means and hence is rotatable with said stud. Said hub 30 of the switch finger is pressed against the outer face of said collar by a compression spring 45 which at its outer end bears against a nut screw-threaded on the stud 19. The hub 31 of the switch finger and the collar are thus pressed into frictional engagement with each other. Said switch finger is otherwise free for rotation on said stud and hence said stud can rotate independently of corresponding movement of said switch finger when the latter is held from rotation.

Said switch finger is moveable into and out of operative engagement with the plunger 53 of a switch 52 having separable contacts 54 which, in the particular switch illustrated are normally disengaged but are adapted to be engaged by the depression of the plunger 53 by movement of the switch finger in a counterclockwise direction, Fig. 10. When the machine is used for drilling, this switch finger rests on a cam 32, Figs. 2, 3, and 4, which is fixed on a shaft 33 provided with a handle 34 for operating it. This handle is located outside the head 6 in which these parts are housed. The handle can be turned to lower the cam so that the switch finger can operate for tapping.

The sliding head is fixed in adjusted position for drilling and tapping by a binding screw 4. The sliding head is provided with a fixed screw 7 having adjustable stop nuts 8 at both ends and passing freely through a hole in a projection 9 which is mounted on the quill and constitutes a stopping device for use in drilling and which is old in the art. Engagement of the stop nuts with the projection limits the uppermost and lowermost positions of the spindle.

The stud 19 is operatively connected to the pinion 18 by means including a latch 22 which is keyed on the operating arms 21 and is pushed down into latching position by a spring 22*a* bearing against a surface 23 on said stud hub 20 itself. This latch has a projection 24 which extends between teeth 25 cut on a collar 26 integral with the pinion 18, so the hub 20 can be turned to raise and lower the quill. It will be noticed that this projection 24 of the latch is considerably narrower than the spaces between the teeth to allow for angular play between the stud and gear and hence between the spindle and switch as will be explained in greater detail later.

Carried by a knockout lever 37, embracing the projection 9 and moving with it and with the quill, is a hub 38 having a smooth perforation for receiving another screw 39 of a similar character to the screw 7, and constituting a knockout rod. This rod has adjustable lock nuts 40 for the same purpose as the nuts 8 but the upper nuts are only limiting stops. At its lower end said rod is fixed to a bushing 41 which is spring-pressed upwardly by a spring 42. This bushing is arranged to slide in an opening in a switch enclosing casing 27 carried by the sliding head 6. In the casing is a plunger 43 which is separated from the knockout rod 39 by a spring 44 in the bushing. When the quill moves downwardly until the hub 38 engages the lower nut 40 the knockout rod will, of course, be forced down and will force down the plunger 43 against the switch finger 31. If released for operation by rotating the holding cam 32 into the position as shown in Fig. 3. This is not a positive movement but is cushioned by the springs but it turns the switch finger. Said spring 45 surrounds the cross head stud 19 and holds the hub 30 against the collar 29 to provide friction.

A pin is carried by the casing 27 and is located in a vertically elongated slot in the pin 43 to permit sufficient movement of said pin to effect operation of the switch finger 31 and to prevent unintentional withdrawal of the pin from the casing.

The gooseneck is provided with a vertical groove between the ways 5 and within this groove is located a cylinder 46 of insulating material. This cylinder is embedded in the gooseneck and communicates with the front of the ways by a vertical slot 47 into which projects a filler block 48 loose on the binding screw 4 for holding the sliding head in position on the ways. The block is provided with a brush holder 49. This brush holder carries a pair of brushes 50 which engage a pair of trolley wires 51 partially embedded in the insulating cylinder 46 but having an exposed surface. These two trolley wires are insulated from each other and each of the brushes 50 engages one of them. These brushes are individually connected by wires 51*a* with the switch 52. The closing of this switch by the depression of said plunger 53, which is forced down by the switch finger above mentioned, serves to close the switch 54 and connect these trolley wires.

The two trolley wires 51 are connected with a solenoid 55 according to the diagram of Fig. 10 so that this completes the circuit and the solenoid is energized. The solenoid circuit is illustrated in Fig. 10 in a well known way to show the running of the three phase motor forward or in reverse, according to the circumstances. The circuit arranged is such that when the solenoid is energized, the motor is reversed and when it is deenergized the motor will run in a forward direction owing to the descent of the solenoid plunger in this case by the action of gravity.

In the operation of tapping, the operator may let go of the arms 21 after the tap is in the hole, provided the arms of equal length on opposite sides of the axis of the stud 19 or the stud otherwise is equally balanced. It is not intended, however, that the operator shall let go of the arm but rather that he shall exert pressure on the arm to move the spindle in the direction of tapping, that is, down for tapping into a hole and up for backing out of the hole, as will be explained later. The tap, of course, will feed itself down at a predetermined rate. The lower nuts 40 are so set that when the hole is nearly tapped the hub 38 will engage them. This pushes the knockout rod down during the rest of the downward feed of the tap in the hole and pushes down the rod 43 to depress the switch finger 31. This closes the switch and connects up the circuits through the brush holder and the trolley wires to the solenoid 55. The result of this is the energization of the solenoid and the raising of the plunger 56 and the reversal of the motor, as will be seen clearly in the diagrammatic view in Fig. 10.

The tap, by the reverse rotation, will begin to thread itself out of the hole and almost immediately the plunger 43 will rise. However, on account of the pressure of the spring 45 against the hub of the switch finger and the friction of the hub against the collar 29, which is now rotating reversely, the switch finger is held down. Thus the switch remains closed so that the motor will not again change its direction, except under manual control, so long as the tap is in and is screwing itself out of the hole. When the tap gets out of the hole the spindle does not rise further and hence there is nothing to hold down the switch finger, except a possible unbalance of the stud 19 and associated parts, assuming there is no manual upward pressure on the operating arm, and the switch finger may rise and open the circuit. If the motor now starts to rotate in a forward direction, that is immaterial. Of course, if the operator moves the operating arm 21 he can cause the reversal of the motor at any time.

With the construction described the operator has control of the direction of tapping at any part of the hole in which the tap may be in. For instance, assume that the tap is out of the hole and that the tap driving motor 13 is reversely rotating because the switch finger 31 holds the switch closed and the solenoid energized for any reason. The operator desires to advance the tap into the hole. He thus moves an arm 21 downwardly and hence turns the stud 19 in a clockwise direction, Fig. 2. The first result of the movement of the stud is to raise the switch finger 31, thereby effecting the deenergization of the solenoid 55 and the quick reversal of the direction of the motor to a forward direction. The pinion 18 is not rotated during the operation of the switch because of the clearance between the latch tooth 24 and the opposing teeth 25 of the pinion hub 26. Further movement of the arm 21 in the same direction causes the latch tooth 24 to engage a tooth 25 and hence rotates the pinion and moves the spindle downwardly. Thus the tap will screw itself into the hole; and the switch is kept up by following the spindle down with the arm 21. If, however, the arm 21 is raised to turn the stud in the opposite direction, this movement being permitted by the clearance between the teeth 24 and 25, the switch finger 31 will be depressed and effect the closing of the switch contacts 54 so that the motor and the spindle will be reversed in rotation and the tap will back out of the hole. It will be apparent that the operator thus can control the direction of tapping with the tap anywhere in the hole, it being merely necessary for the operator to rotate the arm carrying hub 20 and the stud 19 in one direction to screw the tap into the hole and in the opposite direction to back the tap out of the hole.

The angular clearance between the tooth 24 of the latch 22 of the arm-carrying hub 20 and the opposing teeth 25 of the pinion hub 26 is important and is enough to permit sufficient rotation of the stud 19 independently of corresponding rotation of the pinion 18 to effect movement of the switch finger 31 between switch-open and closed positions. Thus, if, for instance, the spindle is descending due to the tap screwing itself into the hole, the stud 19 is free to be rotated to move the switch finger 31 downwardly to close the switch contacts 54 and effect the reversal of the motor and tap. If the tap is backing out of the hole by its backward rotation, the clearance between the tooth 24 and the opposing teeth 25 permits the stud 19 to be rotated to open the switch and effect the forward rotation of the tap.

The machine thus can be operated to simulate hand tapping where, for instance, the tap is advanced into the hole by a succession of short rotary advancing movements with interposed backing out movements.

The pressure of the spring 45 on the hub 30 of the switch finger 31, and hence pressure of the hub on the collar 29, is sufficient to ensure sure movement of the finger in response to rotation of the collar and stud 19, when the rotation is in a direction in which the finger is free for movement, and yet is light enough so that there is no undue pressure between the finger and the switch 52 on rotation of the stud.

The latch 22 carrying the tooth 24 can be rotated in a clockwise direction, Fig. 9, upon slight rotation of the arms 21 about their axes, whereby to elevate said tooth out of the interdental space between two confronting teeth 25 of the pinion hub 26. Thus, with the tooth maintained elevated, the arm-hub 20 can be rotated to position the latch tooth to enter the space between another pair of confronting teeth 25. This arrangement permits the arms 21 to be maintained in a convenient position throughout the range of vertical movement of the spindle.

Having thus described our invention and the advantages thereof, we do not wish to be limited to the details herein disclosed, otherwise than as set forth in the claims but what we claim is:—

1. In a tapping machine, the combination with a reciprocable spindle for supporting a tap and a reversible motor for rotating the spindle, of a solenoid having means for reversing the motor, a sliding head, a pair of wires insulated from each other, said wires being connected with the solenoid, a pair of brushes carried by the sliding head, each in contact with one of said wires, a switch for electrically connecting said brushes, a switch finger for closing the switch, and means whereby, when the spindle descends the switch finger will be operated to close the switch.

2. In a tapping machine, the combination with a reciprocable spindle for carrying a tool, a reversible motor for rotating the spindle, and a solenoid connected with the motor, of a pair of wires separated and insulated from each other, a pair of brush fingers, each in contact with one of said wires, a normally open switch for connecting said wires, means for connecting said wires with the opposite poles of the solenoid, a rod mounted to be capable of moving vertically, means movable vertically with the spindle for actuating said rod and means by which the descent of the rod will close the switch, said solenoid being arranged normally to feed power to the motor to rotate it forwardly when the solenoid is deenergized and for connecting the motor to reverse it when the solenoid is energized.

3. In a tapping machine, the combination with a reciprocable spindle for carrying a tool, a reversible motor for rotating the spindle, and a solenoid connected with the motor, of a pair of wires separated and insulated from each other, a pair of brush fingers, each in contact with one of said wires, means for connecting said wires with the opposite poles of the solenoids, a normally open switch for connecting said wires, a rod mounted to be capable of moving vertically, means movable vertically with the spindle for actuating said rod, a plunger, cushioning means for connecting the plunger with the rod, whereby the descent of the rod will push the plunger down, and means by which the descent of the plunger will close the switch, said solenoid being arranged normally to feed power to the motor to rotate it forwardly when the solenoid is deenergized and for connecting the motor to reverse it when the solenoid is energized.

4. In a tapping machine, the combination with a reciprocable spindle for holding a tapping tool and a reversible motor for rotating the spindle, of a slidable head, ways on which the head is mounted, said head having a recess, a bushing slidable in the recess, a spring for holding the bushing up in the recess, a knockout rod fixed to said bushing, means whereby, when the spindle descends to a predetermined point the knockout rod will be forced down, an electric switch, means for closing the switch when the knockout rod is pushed down, a solenoid for controlling the direction of rotation of the motor, and means for connecting the switch with the solenoid to energize it and reverse the motor when the switch is closed.

5. In a tapping machine, the combination with a reciprocable spindle for supporting a tapping tool and a reversible motor for rotating the spindle, of a pair of conducting wires insulated from each other, a pair of brush fingers, each resting against the exposed surface of one of said wires, an electric switch arranged to be closed by the descent of the spindle, a solenoid for controlling the direction of rotation of the motor, means for connecting said wires with the opposite poles of the solenoid, and electrical connections from the switch through the brush fingers and the two wires for reversing the motor when the switch is closed.

6. In a tapping machine, the combination with a reciprocable spindle for supporting a tapping tool and a reversible motor for rotating the spindle, of an insulating member having a slot, a pair of conducting wires supported by the insulating member and insulated thereby from each other, a brush holder having a pair of brush fingers, each resting against the exposed surface of one of said wires, a switch finger, means for operating said switch finger when the spindle descends, an electric switch finger, a solenoid for controlling the direction of rotation of the motor, means for connecting said wires with the opposite poles of the solenoid, and electrical connections from the switch through the brush fingers and the two wires for reversing the motor when the switch is closed.

7. In a tapping machine, the combination with a reciprocable spindle for supporting the tapping tool and a reversible motor for rotating the spindle, of a switch finger, an electric switch operated by the switch finger, means whereby the switch finger is actuated to close the switch when the spindle descends to a certain point, means connected with the switch for reversing the motor, a cross head stud, a collar thereon, a spring between the collar and the hub for holding the hub frictionally with respect to the cross head stud whereby, when the switch finger is operated to close the switch to reverse the motor, the friction will hold the cross head stud in switch closing position so long as the tap is being fed out of the work.

8. In a tapping machine, the combination with a reciprocable spindle for supporting the tapping tool and a reversible motor for rotating the spindle, of a cross head stud, a quill, means on the stud for operating the quill, a switch finger having a hub through which the cross head stud passes, an electric switch operated by the switch finger, means whereby the switch finger is actuated to close the switch when the spindle descends to a certain point, means connected with the switch for reversing the motor, a collar on the cross head stud, a spring between the collar and the hub for holding the hub frictionally with respect to the cross head stud, whereby, when the switch finger is operated to close the switch to reverse the motor, the friction will hold the cross head stud in switch closing position so long as the tap is being fed out of the work.

9. In a tapping machine, the combination with a reciprocable spindle for carrying the tapping tool, and a reversible motor for rotating the spindle, of a switch finger, an electric switch adapted to be closed by the motion of the switch finger, a knockout rod, means carried by the spindle for moving the knockout rod to actuate the finger to close the switch, a solenoid for controlling the direction of rotation of the motor, means connected with said switch for energizing the solenoid when the switch is closed, and means for lifting the finger out of operative position to render the machine operable for other work.

10. In a tapping machine, the combination with a reciprocable spindle for supporting the tapping tool and a reversible motor for rotating the spindle, of a cross head stud, a quill surrounding the spindle, means loose on the cross head stud for raising and lowering the quill, a toothed collar fixed to said means, a hub fixed on the cross head stud, operating arms on the hub, a latch carried on the operating arms and movable in the hub and having a latch tooth entering the spaces between the teeth on the collar and of a width less than those spaces, for the purpose described.

11. In a tapping machine, the combination of a tap-driving spindle, a spindle-driving motor, an operating member for reciprocating said spindle, and means operated by said operating member for advancing and retracting said spindle and for changing the direction of tapping repeatedly during the progress of the tapping operation.

12. In a tapping machine, the combination of a tap-driving spindle, a reversible spindle-driving motor, an operating member for reciprocating said spindle, and means operated by said operating member for advancing and retracting said spindle and for reversing said motor independently of movement of said spindle for changing the direction of tapping repeatedly throughout the range of movement of said spindle.

13. In a tapping machine, the combination of an advanceable and rectractible tap-driving spindle, an operating member for reciprocating said spindle, a spindle-driving motor, and means operated by said operating member for changing the direction of movement of said spindle and separately for changing the direction of tapping at any position of said spindle throughout its range of movement and independently of any engagement between the tap and the work.

14. In a tapping machine, the combination of a tap-driving spindle, a reversible spindle-driving motor, means for advancing and retracting said spindle, and motor controlling means having an operative connection with and operative in response to a change in the direction of movement of said spindle advancing and retracting means for changing the direction of rotation of said spindle at any position thereof between its limits of movements.

15. In a tapping machine, the combination of a tap-driving spindle, a reversible spindle-driving motor, means for advancing and retracting said sindle, an operating member therefor, and motor reversing means operated by said member for changing the direction of rotation of said motor at any position of said spindle between its limits of movement.

16. In a tapping machine, the combination of a tap, a reversible motor for reversely rotating said tap, means for advancing and retracting said tap, an operating handle for said means, and means responsive to reversal of movement of said handle for changing the direction of rotation of said tap.

17. In a tapping machine, the combination of a tap-driving spindle, a reversible spindle-driving motor, and means for starting the advancing of said spindle and about concurrently therewith changing the direction of rotation of said motor and for starting the retracting of said spindle and about concurrently therewith changing the direction of rotation of said motor.

18. In a tapping machine, the combination of a tap-driving spindle, a reversible spindle-driving motor, advancing and retracting means for said spindle, motor controlling means for controlling the direction of rotation of said motor, and common operating means for both aforesaid means operative in one direction to effect the advance of said spindle and about concurrently therewith one direction of rotation of said motor and operative in the opposite direction to effect the retraction of said spindle and about concurrently therewith the opposite direction of rotation of said motor.

19. In a tapping machine, the combination of a tap-driving spindle, a reversible spindle-driving motor, advancing and retracting means for said spindle, motor controlling means for controlling the direction of rotation of said motor, and common operating means for both aforesaid means operative in one direction to effect the advance of said spindle and one direction of rotation of said motor and operative in the opposite direction to secure the retraction of said spindle and the opposite direction of rotation of said motor, said operating means having a lost-motion connection with one of said two aforesaid means operative to secure reversal of said motor in advance of reversal of movement of said spindle.

20. In a tapping machine, the combination of a tap-driving spindle, a reversible spindle-driving motor, advancing and retracting means for said spindle, motor controlling means for controlling the direction of rotation of said motor, and common operating means for both aforesaid means operative to effect the operation of said motor controlling means prior to operating the spindle.

21. In a tapping machine, the combination of a tap-driving spindle, a reversible-spindle driving motor, a control device movable in opposite directions to effect the advance and retraction of said spindle and motor controlling means responsive to a change in the direction of movement of said device at any position of the tap in the work to effect the reverse rotation of said motor.

22. In a tapping machine, the combination of a tap-driving spindle, a reversible driving motor, a control device movable with said spindle for advancing and retracting it, motor controlling means responsive to a reversal of movement of said control device to effect the reversal of said motor, and means to effect the operation of said motor controlling means prior to movement of said spindle.

23. In a tapping machine, the combination of a tap-driving spindle, a reversible spindle-driving motor, manual means rotatable with movements of said spindle for advancing and retracting it, and switch means for controlling the direction of rotation of said motor having an operative connection with said manual means and operated by movements thereof in opposite directions for effecting the reverse rotations of said motor, said manual means having a loose engagement with said spindle and said motor controlling means having a connection with said manual means for concurrent movement therewith at least to an extent sufficient to effect the operation of said switch means, whereby to condition said motor for reversal prior to movement of said spindle by said manual means.

24. In a tapping machine, the combination of a tap-driving spindle, a reversible spindle-driving motor, spindle advancing and retracting means, switch means controlling the direction of rotation of said motor, operating means for said switch means, a control member common to said spindle advancing and retracting means and said switch means and operative in opposite directions to effect movement of said spindle in opposite directions, and means conditioning said switch means for operation in response to a reversal of movement of said control member to effect reversal of said motor.

25. In a tapping machine, the combination of a tap-driving spindle, a reversible spindle-driving motor, means movable in opposite directions for effecting advance and retraction of said spindle, switch means for effecting reverse rotations of said motor, operating means for said switch means movable into different positions corresponding to reverse rotations of said motor, and a yieldable driving connection between said spindle advancing and retracting means and said switch operating means operative to secure movement of said switch operating means in opposite directions about concurrently with opposite movements of said spindle advancing and retracting means and further movement of said latter means independently of said switch operating means.

26. In a tapping machine, the combination of an advanceable and retractible tap-driving spindle, a reversible spindle-driving motor, a member rotatable in opposite directions for reversely moving said spindle, switch means movable in opposite directions for effecting reverse rotation of said motor, and means providing a slipable driving connection between said rotatable member and said switch means.

27. In a tapping machine, the combination of an advanceable and retractible tap-driving spindle, a reversible spindle-driving motor, a member rotatable in opposite directions for reversely moving said spindle, switch means movable in opposite directions for effecting reverse rotations of said motor, means providing a slipable driving connection between said rotatable member and said means, and means providing for the operation of said switch means independently of said spindle.

28. In a tapping machine, the combination of an axially movable tap-driving spindle, a reversible spindle-driving motor, means including a rack and pinion for moving said spindle axially in opposite directions, a rotatable stud for rotating said pinion in opposite directions, switch means for effecting reverse rotations of said motor, operating means for said switch means having a yielding frictional driving connection with said stud, and means for limiting movement of said operating means in opposite directions.

29. In a tapping machine, the combination of an axially movable tap-driving spindle, a reversible spindle-driving motor, means including a rack and pinion for moving said spindle axially in opposite directions, a rotatable stud for rotating said pinion in opposite directions, switch means for effecting reverse rotations of said motor, operating means for said switch means having a yielding frictional driving connection with said stud, means for limiting movement of said operating means in opposite directions, and means including a loose connection between said stud and pinion for effecting operation of said switch operating means prior to axial movement of said spindle by said stud and pinion.

30. In a tapping machine, the combination of an axially movable tap-driving spindle, a reversible spindle-driving motor, means including a rack and pinion for moving said spindle axially in opposite directions, a rotatable stud for rotating said pinion in opposite directions, switch means for effecting reverse rotations of said motor, operating means for said switch means having a yielding frictional driving connection with said stud, means for limiting movement of said operating means in opposite directions, and means for varying the angular relation between said stud and pinion.

31. In a tapping machine, the combination of an axially movable tap-driving spindle, a reversible spindle-driving motor, means including a rack and pinion for moving said spindle axially in opposite directions, a rotatable stud for rotating said pinion in opposite directions, switch means for effecting reverse rotations of said motor, operating means for said switch means having a yielding frictional driving connection with said stud, means for limiting movement of said operating means in opposite directions, and means for varying the angular relation between said stud and pinion including a series of angularly-spaced teeth in driving connection with said pinion, and a latch in driving connection with said stud shiftable into position between selected different pairs of teeth.

32. In a tapping machine, the combination of an axially movable tap-driving spindle, a reversible spindle-driving motor, means including a rack and pinion for moving said spindle axially, a pinion rotating stud, motor reversing means operated by rotation of said stud, and a loose driving connection between said stud and pinion for effecting operation of said reversing means independently of rotation of said pinion.

33. In a drilling and tapping machine, the combination of an axially movable tap and drill driving spindle, a reversible spindle-driving motor, switch means for effecting reverse rotations of said motor, operating means for moving said spindle axially in opposite directions and for independently operating said switch means for securing reverse rotations of said motor, and means for holding said switch means from operation under urge of said operating means for effecting axial movement of said spindle in opposite directions without reversing said motor.

34. In a tapping machine, the combination of an axially movable tap-driving spindle, a reversible spindle-driving motor, means for moving said spindle axially in opposite directions, switch means for securing reverse rotations of said motor movable into different positions corresponding to opposite directions of rotation of said motor, and operating means for both said spindle moving means and said switch means, said operating means having a loose connection with said spindle moving means for effecting operation of said switch means independently of movement of said spindle.

35. In a tapping machine, the combination of an axially movable tap-driving spindle, a reversible spindle-driving motor, means for moving said spindle axially in opposite directions, switch means for securing reverse rotations of said motor movable into different positions corresponding to opposite directions of rotation of said motor, and operating means for both said spindle moving means and said switch means, said operating means having a loose connection with said spindle moving means for effecting operation of said switch means independently of movement of said spindle, and said switch means having a yieldable operating engagement with said operating means to permit movement of said spindle independently of said switch means.

36. In a tapping machine, the combination with a reciprocable spindle for supporting the tapping tool and a reversible motor for rotating the spindle, of a cross head stud, a quill surrounding the spindle, means loose on the cross head stud for raising and lowering the quill, a toothed collar fixed to said means, a hub fixed to the cross head stud, operating arms on the hub, said hub having a latch tooth entering the spaces between the teeth on the collar and of a width less than those spaces, and motor-controlling switch means having an operative connection with said stud and arranged to be operated by rotation of said stud independently of corresponding rotation of said quill raising and lowering means and permitted by the clearance between said latch tooth and said collar teeth.

37. In a tapping machine, the combination with a reciprocable spindle for holding and operating a tap and a reversible motor for rotating the spindle, of means whereby, when the spindle descends to a predetermined point, the motor will be reversed, and means for keeping the motor reversed until the tap moves out of the hole in the work, said means comprising a member movable in opposite directions with said spindle, and motor-controlling switch means movable in one direction to secure forward rotation of said motor and the advance of said spindle by the tap and movable in the opposite direction to secure reverse rotation of said motor and the retraction of said spindle by the tap, and means providing a slipping frictional driving connection between said switch means and said member, whereby movement of said spindle is effective in holding said switch means in the position of the direction of rotation of the motor that causes such movement of said spindle.

38. In a tapping machine, a reciprocable tap carrying and driving spindle, a reversible motor for driving the spindle in opposite directions, a switch for reversing the motor, means including an operating handle for advancing and retracting the spindle, and connections between the handle and switch and handle and motor for reversing the motor switch at any time during the tapping operation by reversing the direction of movement of the handle.

39. In a tapping machine, a reciprocable tap carrying and driving spindle, a reversible motor for driving the spindle, an operating handle having a lost motion driving connection with the spindle for advancing and retracting it, a motor reversing switch having a connection with said handle such that the initial movement of the handle effects an operation of the switch and continued movement of the handle in the same direction is permitted without a switch operation, said lost motion connection being sufficient to permit switch operation prior to effective engagement between said handle and spindle.

BENJAMIN S. T. BISHOP.
PERCIVAL E. DOW.